(12) United States Patent
Shepherd

(10) Patent No.: US 7,587,435 B2
(45) Date of Patent: Sep. 8, 2009

(54) REPLICATION SYSTEM WITH METHODOLOGY FOR REPLICATING DATABASE SEQUENCES

(75) Inventor: Stephen C. Shepherd, Lakewood, CO (US)

(73) Assignee: Sybase, Inc., Dublin, CA (US)

( * ) Notice: Subject to any disclaimer, the term of this patent is extended or adjusted under 35 U.S.C. 154(b) by 124 days.

(21) Appl. No.: 11/309,940

(22) Filed: Nov. 10, 2006

(65) Prior Publication Data

US 2008/0114816 A1    May 15, 2008

(51) Int. Cl.
G06F 12/00   (2006.01)
G06F 17/30   (2006.01)

(52) U.S. Cl. .................................. 707/204; 707/203
(58) Field of Classification Search ................ 707/203, 707/204
See application file for complete search history.

(56) References Cited

U.S. PATENT DOCUMENTS

| | | | | |
|---|---|---|---|---|
| 5,649,195 | A * | 7/1997 | Scott et al. | 707/201 |
| 5,737,601 | A | 4/1998 | Jain et al. | |
| 5,758,337 | A | 5/1998 | Hammond | |
| 5,781,912 | A * | 7/1998 | Demers et al. | 707/202 |
| 5,794,253 | A * | 8/1998 | Norin et al. | 707/203 |
| 5,924,096 | A * | 7/1999 | Draper et al. | 707/10 |
| 5,995,980 | A | 11/1999 | Olson et al. | |
| 6,012,059 | A * | 1/2000 | Neimat et al. | 707/8 |
| 6,049,809 | A | 4/2000 | Raman et al. | |
| 6,292,808 | B1 * | 9/2001 | Obermarck et al. | 707/202 |
| 6,304,882 | B1 | 10/2001 | Strellis et al. | |
| 6,338,092 | B1 | 1/2002 | Chao et al. | |
| 6,412,017 | B1 | 6/2002 | Straube et al. | |
| 6,457,011 | B1 | 9/2002 | Brace et al. | |
| 6,529,960 | B2 | 3/2003 | Chao et al. | |
| 6,615,223 | B1 | 9/2003 | Shih et al. | |
| 6,643,670 | B2 | 11/2003 | Parham et al. | |
| 6,745,209 | B2 | 6/2004 | Holenstein et al. | |
| 6,820,098 | B1 * | 11/2004 | Ganesh et al. | 707/202 |
| 6,889,229 | B1 * | 5/2005 | Wong et al. | 707/102 |
| 7,065,538 | B2 * | 6/2006 | Aronoff et al. | 707/202 |
| 7,136,881 | B2 | 11/2006 | Gehman et al. | |
| 7,287,043 | B2 * | 10/2007 | Lindsay et al. | 707/200 |
| 7,346,635 | B2 * | 3/2008 | Whitten et al. | 707/204 |
| 7,359,926 | B1 | 4/2008 | Yohe et al. | |
| 2003/0093431 | A1 * | 5/2003 | Cooke et al. | 707/100 |
| 2003/0220935 | A1 * | 11/2003 | Vivian et al. | 707/102 |

(Continued)

OTHER PUBLICATIONS

Sybase Replication Server version 15.0: Configuration Guide (Document ID: DC35818-01-1500-02), Mar. 2006.

(Continued)

*Primary Examiner*—James Trujillo
*Assistant Examiner*—Jorge A Casanova
(74) *Attorney, Agent, or Firm*—John A. Smart; G. Mack Riddle

(57) ABSTRACT

Replication system with methodology for replicating database sequences is described. In one embodiment, for example, in a database system, a method of the present invention is described for replicating a sequence object from a primary database to a replicate database, the method comprises steps of: monitoring changes to table data at the primary database for capturing information sufficiently characterizing the sequence object to allow its replication, the table data being logged to a log file; reading the log file, for determining changes to apply to the replicate database for replicating the sequence object; and reconstructing the sequence object at the replicate database based on the determined changes.

45 Claims, 4 Drawing Sheets

U.S. PATENT DOCUMENTS

2007/0061379 A1* 3/2007 Wong et al. .................. 707/201
2007/0255763 A1 11/2007 Beyerle et al.

OTHER PUBLICATIONS

Sybase Replication Agent version 12.6: Installation Guide (Document ID: DC38268-01-1260-01), 2005.
Sybase Replication Agent version 12.6 Administration Guide (Document ID: DC38261-01-1260-01), 2005.
Sybase Replication Server 12.6: Installation Guide (Document ID: DC32236-01-1260-01), 2003.
Sybase Replication Agent version 12.6: Administration Guide vol. 1 (Document ID: DC32511-01-1260-01), 2003.
Sybase Replication Agent version 12.6: Administration Guide vol. 2 (Document ID: DC32518-01-1260-01), 2003.
An Introduction to Database Systems (Ch 1-4), 7th Ed., Addison Wesley, 2000.
Information Technology—Database languages—SQL , American National Standard ANSI/ISO/IEC 9075: 1992.
Information Technology—Database languages—SQL (Ch 4), American National Standard ANSI/ISO/IEC 9075: 1992.

* cited by examiner

REPLICATION SYSTEM WITH METHODOLOGY FOR REPLICATING DATABASE SEQUENCES

CROSS REFERENCE TO RELATED APPLICATIONS

The present application is related to the following commonly-owned, presently-pending application(s): application Ser. No. 10/605,154, filed Sep. 11, 2003, entitled "Database System Providing Improved Methods For Data Replication". The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

[Appendix Data Text]

BACKGROUND OF INVENTION

1. Field of the Invention

The present invention relates generally to replication of information in data processing environments and, more particularly, to system and methods for replication of sequences which occur in database systems (e.g., Oracle sequences).

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information may be retrieved from or updated in such files, and so forth, all without user knowledge of the underlying system implementation. In this manner, the DBMS provides users with a conceptual view of the database that is removed from the hardware level.

DBMS systems have long since moved from a centralized mainframe environment to a de-centralized or distributed environment. Today, one generally finds database systems implemented as one or more PC "client" systems, for instance, connected via a network to one or more server-based database systems (SQL database server). Commercial examples of these "client/server" systems include Powersoft® clients connected to one or more Sybase® Adaptive Servers® Enterprise database servers. Both Powersoft® and Sybase® Adaptive Servers® Enterprise (formerly Sybase® SQL Server®) are available from Sybase, Inc. of Dublin, Calif. The general construction and operation of database management systems, including "client/server" relational database systems, is well known in the art. See e.g., Date, C., "An Introduction to Database Systems, Volume I and II", Addison Wesley, 1990; the disclosure of which is hereby incorporated by reference.

Each day more and more users base their business operations on mission-critical systems which store information on server-based database systems, such as Sybase® Adaptive Servers® Enterprise. As a result, the operations of the business are dependent upon the availability of data stored in their databases. Because of the mission-critical nature of these systems, users of these systems need to protect themselves against loss of the data due to software or hardware problems, disasters such as floods, earthquakes, or electrical power loss, or temporary unavailability of systems resulting from the need to perform system maintenance.

One well-known approach for users to guard against loss of critical business data is to maintain a standby or replicate database. A replicate database is a duplicate or mirror copy of a given database that is maintained either locally at the same site as the primary database or remotely at a different location than the primary database. The availability of a replicate copy of a given database enables a user (e.g., corporation or other business) to reconstruct a copy of a given database in the event of the loss, destruction, or unavailability of the primary database.

Today, a lot of database processing involves managing data that follows some sort of sequence, such as a sequence of customer numbers, account numbers, part numbers, or the like. A "sequence" number or identity may be used for this purpose. Of particular interest are Oracle sequences or "Sequence Objects." Each Oracle sequence is a database object that provides a sequential series of numbers. Here, the database system maintains a sequence counter, so a unique sequence number may be provided, as required for the task at hand. In Oracle database systems, sequence numbers are Oracle integers defined in the database of up to 38 digits. A sequence definition indicates general information, including: the name of the sequence; whether the sequence ascends or descends; the interval between numbers; and whether the (Oracle) database system should cache sets of generated sequence numbers in memory. Sequence numbers are generated independently of tables, so the same sequence can be used for one or for multiple tables. Sequence number generation is useful to generate unique primary keys and to coordinate keys across multiple rows or tables. A sequence is especially useful in a multi-user environment for generating unique sequential numbers without the overhead of disk I/O or transaction locking.

Sequence numbers are used by SQL statements that reference the sequence. For example, a database user can issue a statement to generate a new sequence number or use the current sequence number. After a statement in a user's session generates a sequence number, the particular sequence number is available only to that session. Each user that references a sequence has access to his or her own current sequence number. Oracle sequences have a "cache" option that pre-allocates a set of sequence numbers and keeps them in memory, so that sequence numbers can be accessed faster. When the last of the sequence numbers in the cache has been used, the Oracle database system reads another set of numbers into the cache. The Oracle database system might skip sequence numbers if one chooses to cache a set of sequence numbers. In that case, when an instance abnormally shuts down, sequence numbers that have been cached but not used are lost. Sequence numbers that have been used but not saved are lost as well.

When a sequence number is generated, the sequence is incremented, independent of any associated transaction committing or rolling back. If two users concurrently increment the same sequence, the sequence numbers each user acquires may have gaps because sequence numbers are being generated by the other user. One user can never acquire the sequence number generated by another user. Once a sequence value is generated by one user, that user can continue to access that value regardless of whether the sequence is incremented by another user. It is possible that individual sequence numbers will appear to be skipped, because they were generated and used in a transaction that ultimately rolled back. Additionally, a single user may not realize that other users are drawing from the same sequence.

In the area of database replication, sequences pose a special set of problems. In particular, due to the ability to lose cached sequence values or to lose sequence values from rollback processing, each possible sequence value may not be used or replicated. Nevertheless, it is desirable to provide support for the replication of sequence objects, in order to provide complete support for Oracle databases. This requirement is particularly important for standby implementations where the standby site is expected to provide an identical image of activity from the primary site. Given this customer expectation, there is great interest in providing a replication solution for replicating sequences. The present invention fulfills this and other needs.

SUMMARY OF INVENTION

Replication system with methodology for replicating database sequences is described. In one embodiment, for example, in a database system, a method of the present invention is described for replicating a sequence object from a primary database to a replicate database, the method comprises steps of: monitoring changes to table data at the primary database for capturing information sufficiently characterizing the sequence object to allow its replication, the table data being logged to a log file; reading the log file, for determining changes to apply to the replicate database for replicating the sequence object; and reconstructing the sequence object at the replicate database based on the determined changes.

In another embodiment, for example, a system of the present invention for replicating database sequence objects is described that comprises: a primary database defining a sequence object; a replicate database for receiving replication of the sequence object; a system table in the primary database for managing the sequence object; a log file storing log records that record changes to the primary database, including changes to the system table; and a log reader supporting replication of the sequence object to the replicate database based on changes recorded in the log file.

In yet another embodiment, for example, a system of the present invention is described for replicating database sequence objects comprises: a primary database having a sequence defined; a replicate database for receiving replication of database information from the primary database, including replication of the sequence; a module for monitoring changes to table data at the primary database for capturing information sufficiently characterizing the sequence to allow its replication, the table data being logged to a log file; a module for reading the log file, for determining changes to apply to the replicate database for replicating the sequence; and a module for replicating the sequence object to the replicate database, based on the determined changes.

DETAILED DESCRIPTION

Glossary

Figure 1:
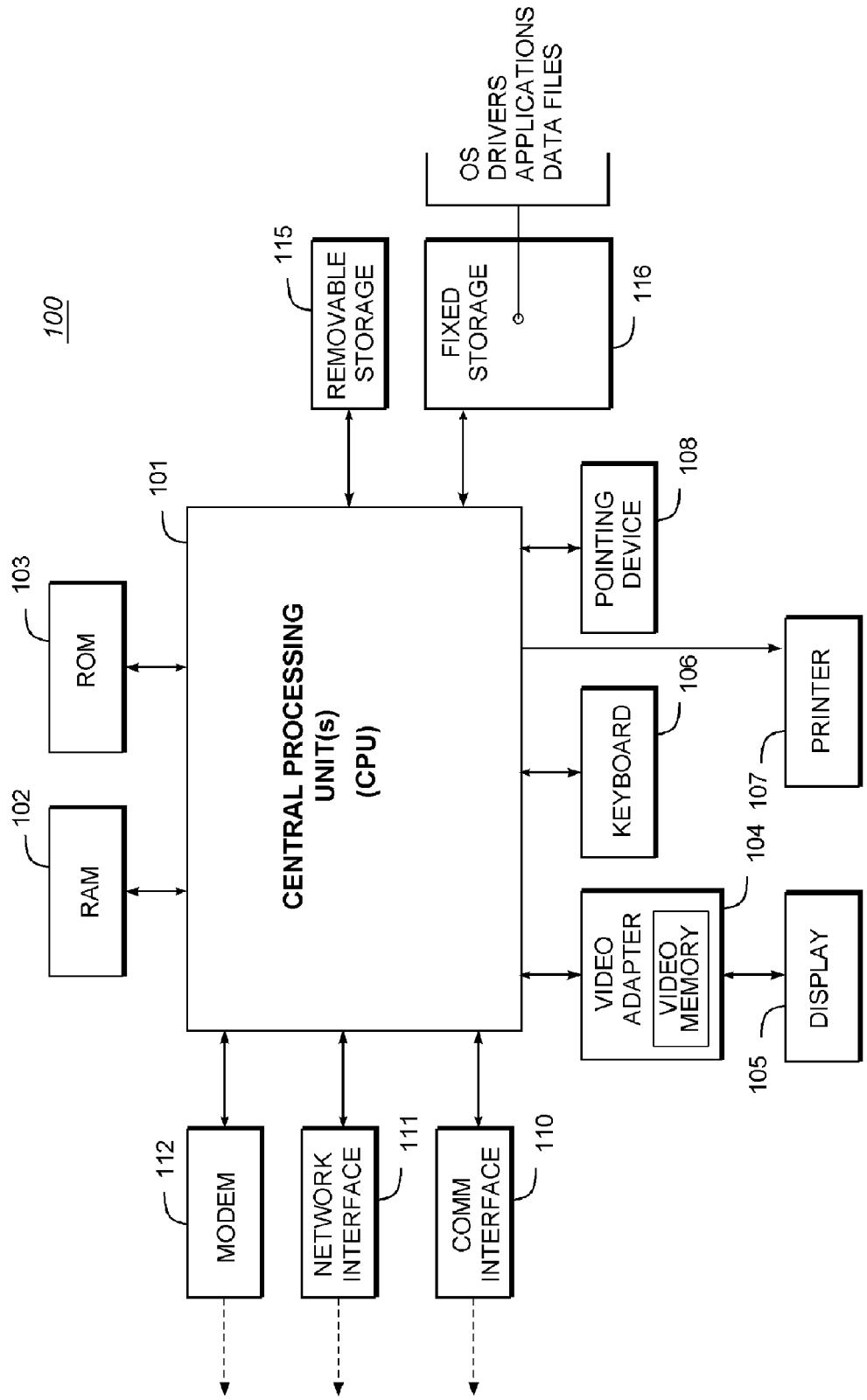
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. A feature of a relational database is that users may define relationships between the tables in order to link data that is contained in multiple tables. The standard user and application program interface to a relational database is the Structured Query Language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)-1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying computer components that may be employed for implementing the present invention. For purposes of discussion, the following description will present examples in which it will be assumed that there exists a "server" (e.g., primary database server) that communicates with one or more systems (e.g., replication server). The present invention, however, is not limited to any particular environment or device configuration. In particular, a server-based distinction is not necessary to the invention, but is used to provide a framework for discussion. Instead, the present invention may be implemented in any type of system architecture or processing environment capable of supporting the methodologies of the present invention presented in detail below.

Introduction to Sequence Replication

For purposes of economy and efficiency, the present invention is implemented by modifying an existing replication system (e.g., Sybase® Replication Agent™). Therefore, the discussion which follows focuses on the specific modifications to the existing replication server (Replication Server) that are required for implementing the system and methodology of the present invention. For general background description of the Sybase® Replication Agent™, see, e.g., Sybase Replication Agent version 12.6: Installation Guide (DOCUMENT ID: DC38268-01-1260-01), available from Sybase, Inc. of Dublin, Calif. (and currently available via the Internet at infocenter.sybase.com/help/topic/com.sybase.help.doc.rso_docs_12.6.ra126ig/ra126ig.pdf); also see, Sybase Replication Agent version 12.6 Administration Guide (DOCUMENT ID: DC38261-01-1260-01), also available from Sybase, Inc. (and currently available via the Internet at infocenter.sybase.com/help/topic/com.sybase.help.doc.rso_12.6.ra126ag/ra126ag.pdf). See also, Sybase Replication Server® 12.6: Installation Guide (DOCUMENT ID: DC32236-01-1260-01), available from Sybase, Inc. (and currently available via the Internet at infocenter.sybase.com/help/topic/com.sybase.help.rs_12.6.rs126igw/pdf/rs126igw.pdf); as well as, Sybase Replication Agent version 12.6: Administration Guide Volumes 1 and 2 (DOCUMENT IDs: DC32511-01-1260-01 and DC32518-01-1260-01, respectively), available from Sybase, Inc. (and currently available via the Internet at infocenter.sybase.com/help/topic/com.sybase.help.mro12.6.rsadm1/pdf/rsadm1.pdf and infocenter.sybase.com/help/topic/com.sybase.help.mro12.6.rsadm2/pdf/rsadm2.pdf, respectively). The disclosures of the foregoing are hereby incorporated by reference.

Sequence replication requires that one capture the numeric value assigned to a sequence and replicate that value to a standby site. The existing replication system (Replication Server) employed for implementing the present invention does not recognize an object type of "sequence". The primary objects supported by the Replication Server are tables and procedures. Modification of the Replication Server to directly support sequence objects, although one possible solution, is not the currently preferred embodiment. As a result, Oracle Sequence modification is instead replicated as an object type that the Replication Server already understands, namely, table or procedure.

Changes to Oracle Sequence objects are represented by changes (updates) to the Oracle system sequence (sys.seq$) table. These changes do not occur with each new sequence value generated. Instead, the sys.seq$ table is updated periodically, based on sequence caching refresh activity or other system changes. The value stored in the sys.seq$ table for a sequence is the "next" value to be assigned "after" the existing cache of values has been exhausted.

As an example, a newly created sequence starts with a value of 1, increments by 1 and has a cache value of 20. These are all default values and can all be customized. The value stored in the sys.seq$ record for this new sequence is 21. This indicates that the "next" value to be used by the sequence, after the existing cache of 20 numbers is used, is 21. The record in sys.seq$ does not change until the sequence value hits 21. At that time, Oracle will "cache" the next 20 values for the sequence, and the sys.seq$ record will be updated to 41. It is this value (41) that is recorded as a change to the sequences sys.seq$ record, that will be used for replication. Importantly, recognize that not every individual sequence update is recorded in the log, and is therefore not available for replication. Additionally, updates to the sys.seq$ table for sequence incrementing occur inside a system transaction referred to as a "recursive" transaction. These changes do not occur within the context of the transaction that may have incremented the sequence. In other words, the sequence will typically be updated as part of its own transaction (have its own BEGIN and COMMIT statements) when replicated.

Replication Components

Figure 2:
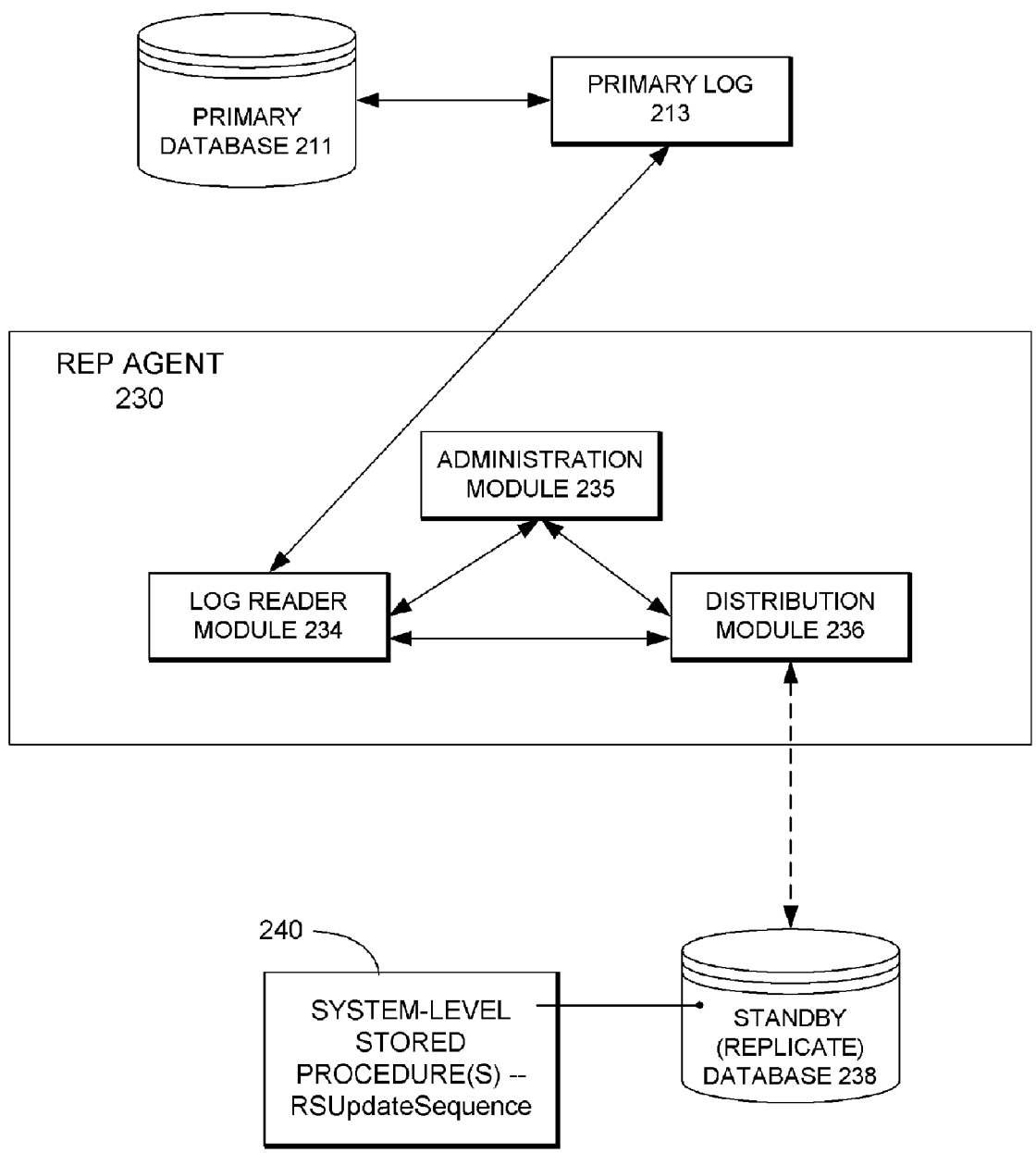
FIG. 2 is a high-level block diagram of an exemplary environment in which a database system is supported by a replication system of the present invention.

FIG. 2 is a high-level block diagram of an exemplary environment 200 in which a database system is supported by a replication system of the present invention. Environment 200 includes at least one server supporting a primary database 211 and a standby or replicate database 238. The primary database 211 may be located at the same machine and/or site as the replicate database 238 or may be located at a different machine and/or location. As shown, the primary database 211 is logically connected to the replicate database 238 via a replication agent ("RepAgent") 230. The replicate database 238, operating under control of a replicate database server, includes one or more system stored procedures 240. In the currently preferred embodiment, the present invention is implemented using one or more of the system stored procedures 240. The operation of each of these components will now be described in more detail.

The primary database 211 is the database containing the data that is replicated to the standby or replicate database 238 through the use of the replication methodology, as embodied in the replication agent 230. The primary database 211 is also known as the "source" database as it is the source of the data being replicated (i.e., where data is being replicated from). As the present invention provides procedure replication support (e.g., for stored procedures and functions) to database systems lacking facilities for logging stored procedure invocations (e.g., Oracle), the primary database is typically implemented using such a database system (e.g., Oracle 9, available from Oracle Corporation of Redwood Shores, Calif.). However, the primary database may alternatively be implemented as another type of database or file system, particularly in instances where such replication support is required.

The primary database 211 is typically used to support the operations of a user application or system (not shown). For instance, the primary database 211 may be employed to support an on-line transaction processing (OLTP) application, such as a sales and order processing application. As the application operates, the posting of data from "transactions" are posted to one or more database tables of the primary database 211. As part of this process, the primary database 211 employs a logging system to log changes which occur in the system to a primary (transaction) log 213.

In a commercial embodiment such as Oracle or Sybase® Adaptive Servers® Enterprise, this is done by copying log records to the database's transaction (primary) log 213. (For further information on logging operations in a database system, see e.g., U.S. Pat. No. 6,321,234 titled "Database server system with improved methods for logging transactions"). Every transactional operation, including inserts, updates, and deletes to the database, causes a log record to be written to the transaction (primary) log 213, which is commonly referred to simply as the "log." Each particular log record characterizes the change which has occurred to the primary database 211 during processing of a transaction. These log records can be used, for instance, in error recovery, to restore the database 211 to a preexisting, consistent state. The replication agent 230 includes a log reader module 234, administration (LogAdmin) module 235, and distribution (or distributor) module 236, which operate to maintain the replicate database 238 from the log records. SQL transactions are read from the primary log 213 (or reconstructed from replicated log records, not shown) and are applied to the replicate database 238.

The log reader module 234 is responsible for reading log records from a database log (i.e., primary or mirror log records). It is also responsible for log management in the case of multiple log files (both online and archived). The log reader module 234, which includes interfaces to the administration module 235 and distribution module 236, has access to primary database schema metadata in order to fully read and understand a log record from the primary log. In operation, the log reader module reads the log records and uses the schema information, which is managed by the administration module 235, to build a complete transaction operation. It then queues the operation for delivery by the distribution module 236 to the replicate database 238.

The distribution module 236, which interfaces with the log reader module 234 and the replicate database 238, is responsible for formatting and sending log records to a destination (e.g., replicate database 238) in a manner that is consistent with how original transaction(s) were executed at the primary database 211. The distributor 236 reads a transaction (which may contain one or more operations) from a queue populated by the log reader module 234. The distributor then formats the transaction operation(s) (e.g., into a Structured Query Language (SQL) statement) and executes the transaction operation(s) at the replicate database 238 (e.g., via a JDBC database connection). The distribution module 236 is also responsible for keeping track of the last committed transaction in order to avoid missing or duplicating any transactions.

The administration module 235, which has interfaces with the primary database 211 and the log reader module 234, is responsible for integrating and managing the operation of the other system components. This includes system property and state management as well as command routing services. The administration module 235 also provides an interface that all components can use for storage of system metadata, such as the primary database schema information. In addition, the module is responsible for system initialization on startup. This includes all setup required on initial startup, as well as error checking on subsequent startups of the replication system. On initial startup, the administration module captures schema from the primary database and keeps it in an internal format for access by the log reader.

As shown, the system-level stored procedures 240 include a sequence update stored procedure (rs_update_sequence) of the present invention. For supporting the sequence update stored procedure, it is assumed that the replication database server hosting the replicate database supports stored procedures (which practically all commercial database servers do), and thus the sequence update stored procedure itself need only be implemented in the particular SQL dialect for the particular database server (e.g., Oracle 9) selected. No additional configuration or features are required. In basic operation, the sequence update stored procedure monitors the base (Oracle) system table governing sequences, sys.seq$ (system sequence table) on an Oracle platform for example, which resides on the primary database 211. Changes that occur in the system sequence table will show up in the primary log file 213. The Replication Agent 230 will read those changes (log reader 234) and distribute those changes (distribution module 236) to the replication server (hosting the replicate database 238), which in turn invokes the rs_update_sequence stored procedure of the present invention. The methods of operation of the present invention supporting replication of sequences will now be described in further detail.

Modified Replication System

The following discussion focuses on changes required for implementing the system and methodology of the present invention.

Oracle Sequence Replication Solution Overview

When a sequence is marked for replication, changes to that sequence against sys.seq$ (system sequence table) are captured and sent to the Replication Server in the form of parameters passed to a procedure. The stored procedure rs_update_sequence is installed at the standby site as part of system setup, as well as a function replication definition for that procedure. At the standby site, an implementation of rs_update_sequence increments a same-named sequence until its value is equal to that at the primary.

The Replication Server itself treats everything that starts with "rs_" as a reserved word. The "function replication definition" has to be the same name as the procedure (for compatibility with Rep Server). As a result, the name used by the RA is "rep_update_sequence" and this is also the name of the function replication definition. The "deliver as" clause of the function replication definition is used to correctly target the replicate function named rs_update_sequence. Using the rs_update_sequence name in the replicate allows easier recognition of all replicate objects, since they all begin with "rs_".

Performance Considerations

Compared to the performance of incrementing a sequence at the Primary database, particularly where sequence values are cached, the effort to increment the same sequence at the standby site may be less efficient. The stored procedure must dynamically determine the sequence to increment, and must loop internally, incrementing the sequence until the primary value has been reached. The loop is required because there is no way to "assign" a specific value to a sequence.

Using the prior example (from Oracle Redo Logging), when the sys.seq$ value is updated to the next value (41 in the prior example), this value, along with the sequence name, is passed as an argument to the stored procedure. At the standby site, the procedure then increments (using the Oracle <sequence>.nextval function) the sequence until the value is set to 41. If the sequence value at the standby site was previously 21, the rs_update_sequence stored procedure calls <sequence>.nextval 20 times during execution. Since the name of the sequence is passed as a parameter, the Oracle database system cannot pre-compile the procedure for efficiency. With the addition of the looping activity required to properly increment the sequence, the performance of the solution may impact some environments where a large number of highly used sequences is the norm. Due to this possible performance concern, replication of sequences will not be a default choice for any Replication Agent implementation. Similar to procedure replication, a sequence will only be replicated when explicitly marked, regardless of product or configuration.

Alternatives

If the performance of sequence replication is a concern, there are other alternatives to replication that support primary and standby use of the same sequence. These alternatives are compatible with current suggestions by Oracle and others interested in providing sequence coordination between multiple sites.

Assuming the sequence is being used to generate primary key values, the sequence at each site can be concatenated with something unique to the site. For example, one can use a sequence number concatenated with the database name, site name or something similar. This technique allows each site to maintain a unique "range" of sequence of numbers. Each site having a unique range would mean there would be no value in sending (replicating) changes to one site's range to another site.

Similar to concatenating, each site could obtain a different range of numbers by having different starting points, or increment values, for the same sequence. As an example, the sequence at one site could start at one and increment by two to generate odd numbers (1, 3, 5, etc.) while the other site starts at two and generates even numbers (2, 4, 6 etc.). Again, each site would have a unique range and could avoid any need for replication.

A third option is available to standby solutions, where the standby site is for read-only, and does not access the sequence value until fail-over. Rather than continually replicate a sequence's value, the value of the sequence at the standby site could be updated as part of the failover tasks. After failover and before the standby allows connection to client applications, a script or procedure could query the last used sequence value (based on the last table to use it for a primary key) and update or redefine the sequence one, based on that calculated value.

Marking Sequences for Replication (API Change)

Similar to support for table and procedure replication, Oracle Sequences are individually marked for replication using a new Replication Agent API command:

pdb_setrepseq

The command returns the sequence replication marking status; marks specified sequence for replication; unmarks all marked sequences or a specified sequence; and enables or disables replication for all marked sequences or a specified sequence. This command is available for Oracle systems only.

Syntax usage is as follows:

To return sequence replication marking status:
pdb_setrepseq [sequence_name/mark/unmark/enable/disable]

To unmark, enable, or disable all marked sequences:
pdb_setrepseq all, {unmark[, force]/enable/disable}

To mark, unmark, enable, or disable a specified sequence:
pdb_setrepseq sequence_name, {mark/unmark[, force]/enable/disable}

To mark a specified sequence for replication with a replicated name:
pdb_setrepseq sequence_name, repname, mark Parameters:

Sequence_name: The name of a user sequence in the primary database.

The sequence_name option can be delimited with quote characters to specify the character case. If mixed character case (both uppercase and lowercase) is required, the name must be delimited, for example: "Sequence". The sequence_name parameter can be owner-qualified to include the primary sequence owner name, with each element separated by a period, for example: owner.sequence If one must use an object name case that does not match the setting of the ltl_character_case parameter, the object name is required to be delimited. If an object name contains any non-alphanumeric characters, such as spaces, periods, and so forth, it must be delimited with quote characters, for example:
"sequence name"
owner."sequence name"

The replicated name ("repname") is the sequence to be updated at the replicate site, if desired to be different than the sequence name at the primary site. The repname option can be delimited with quote characters to specify character case (see, e.g., the sequence_name parameter description). By specifying a replicated name, sequence updates can be replicated to a sequence in the replicate database that has a different sequence name from the primary database.

The repname option can be owner-qualified to include the replicate sequence owner name, with each element separated by a period, for example:
repowner.repname The "all" keyword refers to all user sequences in the primary database. By using the all keyword, one can unmark all user sequences, or apply an enable or disable operation to all marked sequences.

The "mark" keyword refers to marking user sequences for replication. The "unmark" keyword refers to unmarking marked sequences.

A "force" keyword is provided to refer to the unmark operation. When the force keyword follows the unmark keyword, the pdb_setrepseq command immediately unmarks the specified sequence in the primary database, without first checking the enable status of the sequence. When the force keyword follows the unmark keyword and the all keyword, the pdb_setrepseq command immediately removes replication marking from all marked sequences in the primary database, regardless of their enable status. An "enable" keyword is provided to refer to enabling replication for marked sequences. A "disable" keyword is used to refer to disabling replication for marked sequences.

Replication Definition for rep_update_sequence

The Replication Agent installations that support sequence replication provide a script or other process to create the function replication definition necessary to support replication. The name of the function replication definition is rep_update_sequence, with a "deliver as" clause to indicate the replicate stored procedure to be executed is "rs_update_sequence".

Procedure rs_update_sequence

The Replication Agent installations that support sequence replication provide a script or other process to create the rs_update_sequence procedure at the standby site. By default, the procedure created will support incrementing a sequence in an Oracle database. If a customer wishes to replicate sequence values to a non-Oracle site, the customer must create and install a customized version of the procedure at the replicate database.

Determining the Replicate Sequence Value from Replication

As described previously, the value replicated for a sequence is the change to sys.seq$ that indicates the next sequence value to be assigned after the current sequence's cache has been exhausted. As an example, when a sequence is created as:

Create sequence mysequence cache 20 increment by 10

The first call to mysequence.nextval will return 1, and the sys.seq$ table will be updated with the "next" number to be used after the cache of 20 numbers is exhausted. The number will be 201 (the first value "1" plus increment (10) times cache size (20).

$$(1+(10*20))=201$$

This value of 201 then is the value "replicated", or sent to procedure rs_update_sequence at the replicate site.

When rs_update_sequence is executed, it will loop performing sequence_name.nextval until the value returned is greater than or equal to the value passed. For the case of value 201 being passed for sequence "mysequence", rs_update_sequence will call mysequence.nextval until the value returned is 201 or greater.

Subsequent to replication, if one wants to determine what the replicate value of a sequence should be, one can query the all_sequences view to get the "next" value to be used when the cache is used up (i.e., one does not have to manually calculate it). The following query will provide the value that should be the last replicated value for a sequence:

SELECT LAST_NUMBER FROM ALL_SEQUENCES WHERE SEQUENCE_NAME='MYSEQUENCE';

In this example, the value returned would be "201" after the first call to mysequence.nextval. This means the value of the sequence at the replicate site will be at least 201, even though the next value at the primary is just 11 (1+interval of 10).

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

When a sequence is marked (identified) for replication, changes to that sequence recorded in sys.seq$ are captured by a process reading the Oracle transaction log. These changes are distributed to the standby site via Sybase Replication Server in the form of parameters passed to a database stored procedure. The procedure, installed at the standby site, interrogates the passed parameters and subsequently increments the same-named sequence at the standby site until its value is equal to that at the primary.

The logic in the procedure must accommodate sequences that can increment, or decrement in value. Sequences whose value can "wrap" (start over at the beginning once a maximum limit has been reached) must also be accommodated, as well as those sequences whose increment value is greater than 1 (the default). As an example, a sequence whose increment value is 2 (i.e., increments in the order of 2, 4, 6, 8, etc.) must be accommodated.

Figure 3:
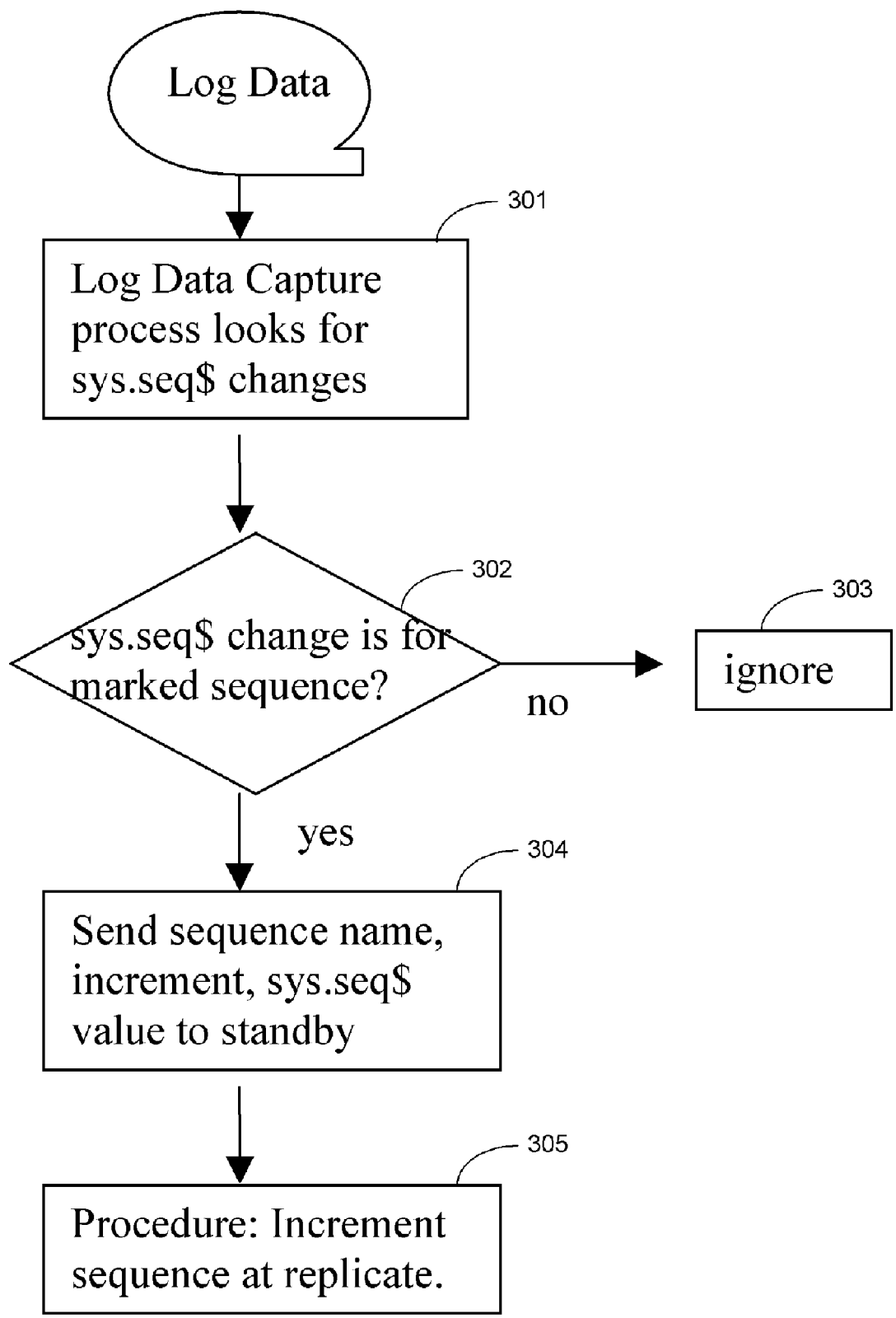
FIG. 3 is a flowchart illustrating an overall method performed by the replication system of the present invention for replicating database sequences (sequence objects), such as those employed on Oracle database systems.

FIG. 3 is a flowchart illustrating an overall method performed by the replication system of the present invention for replicating database sequences (sequence objects), such as those employed on Oracle database systems. While monitoring the Oracle transaction log, the system captures any changes to system table sys.seq$, as indicated at step 301. At step 302, the system tests for the presence of a sys.seq$ row that has been updated and is keyed by an object id number equal to the object id of a sequence that has been marked (identified) for replication; in that case (i.e., "Yes"), the system will save and transmit the sequence name, object id, and increment value. If the sequence is not marked for replication (i.e., "No"), the information is ignored, at step 303, and the method concludes.

Continuing to step 304 (i.e., "Yes" case from step 302), the system sends a transaction to the Replication Server that indicates the associated sequence name, increment value, and the value of the sequence captured from the sys.seq$ row. At step 305, the Replication Server invokes logic (in the form of a stored procedure) at the standby (replicate) database, passing the sequence name, increment value, and the value captured from the sys.seq$ row in the primary database. The specific operation of the stored procedure will now be examined.

Figure 4:
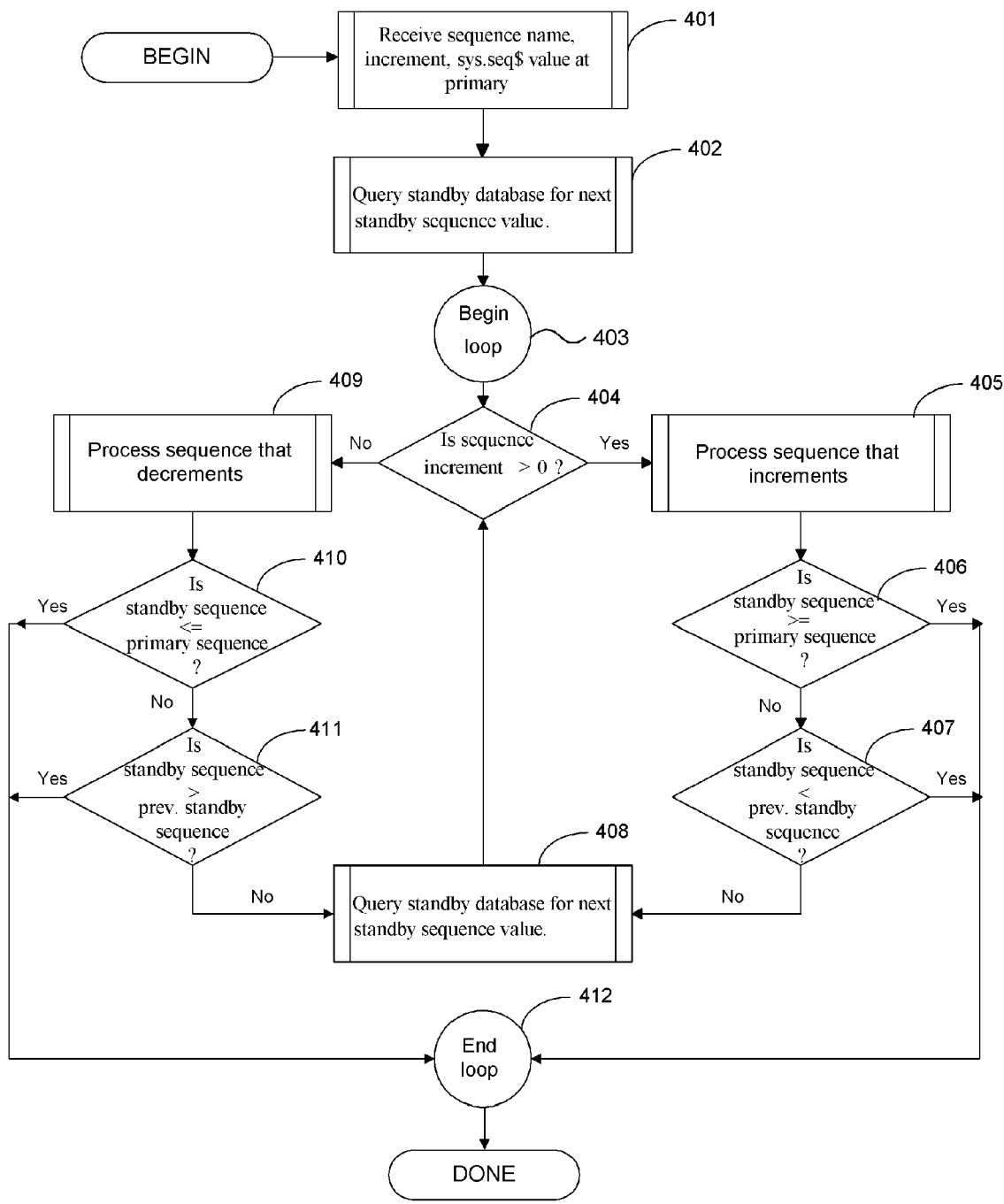
FIG. 4 is a flowchart illustrating the method of operation performed by the stored procedure embodied in the replication system of the present invention.

FIG. 4 is a flowchart illustrating the method of operation performed by the sequence update stored procedure (rs_update_sequence) embodied in the replication system of the present invention. At step 401, the stored procedure (stored in the standby database) receives the sequence name, increment value, and the value captured from the sys.seq$ row in the primary database. At the standby database, the invoked stored procedure may now proceed to select the next available sequence value, as indicated by step 402. A loop, established at step 403, operates while the standby sequence value is less than the sequence value at the primary database. At step 404, the stored procedure determines if the increment value (sequence increment) is a positive or negative number. (A sequence value of zero would indicate that a sequence is not defined, and thus sequence replication is not required.) In the case of a positive number, execution continues to step 405, where the stored procedure processes a sequence that increments in value each time a new sequence value is requested. At step 406, the execution of the procedure may exit the loop if the standby sequence value is greater than or equal to the primary sequence value. Otherwise, execution continues to step 407. At that step, the execution of the procedure may exit the loop if the current standby sequence value is less than the previous standby sequence value. This condition is true when the sequence value has wrapped, allowing the sequence to be reset to its initial value. If the current standby sequence value is not less than the previous standby sequence value (i.e., "No" at step 407), the procedure continues execution, to step 408, to get the next standby sequence value from the standby database and thereafter continue the loop (by jumping back to step 404).

In the case of a negative number at step 404, execution continues to step 409. At that step, the stored procedure processes a sequence that decrements in value each time a new sequence value is requested. The procedure may exit the loop, at step 410, if the standby sequence value is less than or equal to the primary sequence value. Otherwise, execution continues to step 411. At that step, the procedure may exit the loop if the current standby sequence value is greater than the previous standby sequence value. This condition is true when the sequence value has wrapped, allowing the primary sequence to be reset to its initial value. Otherwise, the procedure hits the end of the loop, at step 412, whereupon the procedure's execution terminates. Significantly, the sequence value at the standby database is the same value or greater than the value at the primary database (e.g., for ascending sequence). This insures that no previous value of the sequence can be used should the system switch from the primary to the standby database.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, a method for replicating a sequence object from a primary database to a replicate database, the method comprising:

marking a sequence object at the primary database for replication, wherein said sequence object comprises a database object providing a sequential series of sequence numbers for performance of database tasks at the primary database;

monitoring changes to table data at the primary database for capturing information sufficiently characterizing the sequence object to allow its replication, the table data being logged to a log file in response to a sequential series of multiple sequence numbers being cached for use at the primary database;

reading the log file, for determining changes to apply to the replicate database for replicating the sequence object; and reconstructing the sequence object at the replicate database based on said determined changes.

2. The method of claim 1, wherein said monitoring changes to table data step includes:

monitoring table data changes to a system sequence table that governs sequence objects.

3. The method of claim 1, wherein said log file comprises a primary log file for said primary database.

4. The method of claim 1, further comprising:

receiving user input for selectively marking different sequence objects for replication.

5. The method of claim 1, wherein said reconstructing step includes:

sending said determined changes as parameters passed to a stored procedure stored at the replicate database.

6. The method of claim 5, wherein said parameters include a sequence name for said sequence object.

7. The method of claim 5, wherein said parameters include a primary sequence value for said sequence object.

8. The method of claim 5, wherein said parameters include a sequence increment value for said sequence object.

9. The method of claim 1, wherein changes to the table data are logged to the log file, so that such changes may be read by a log reader employed for replicating.

10. The method of claim 9, wherein the log reader includes program logic for recognizing log information in the log file corresponding to table data inserted into a system sequence table as special purpose information supporting sequence object replication.

11. The method of claim 1, wherein said reconstructing step includes:

incrementing a sequence value at the replicate database until it at least equals the sequence object's sequence value at the primary database.

12. The method of claim 11, wherein said incrementing step includes:

establishing a loop to increment a sequence value at the replicate database, until the sequence value at the replicate database at least equals the sequence object's sequence value at the primary database.

13. The method of claim 1, wherein said reconstructing step includes:

if the sequence object is defined to have an ascending sequence interval, incrementing a sequence value at the replicate database until it at least equals the sequence object's sequence value at the primary database; and, otherwise decrementing the sequence value at the replicate database until it is no greater than the sequence object's sequence value at the primary database.

14. The method of claim 1, wherein said primary database comprises a relational database of a first type and said replicate database comprises a relational database of a second type, and said sequence object comprises a sequence object supported by the relational database of the first type.

15. A computer-readable medium storing processor-executable instructions for performing the method of claim 1.

16. A system for replicating database sequence objects, the system comprising:

a computer having a processor and memory;

a primary database defining a sequence object, wherein said sequence object is a database object providing a sequential series of sequence numbers as required when database tasks are performed;

a replicate database for receiving replication of the sequence object;

a system table in the primary database for managing the sequence object;

a log file storing log records that record changes to the primary database, including changes to said system table when a sequential series of multiple sequence number are cached for use at the primary database; and a log reader supporting replication of the sequence object to the replicate database based on changes recorded in the log file.

17. The system of claim 16, wherein said system table comprises a system sequence governing sequence objects.

18. The system of claim 16, wherein said log file comprises a primary log file for said primary database.

19. The system of claim 16, further comprising:

a module for receiving user input for selectively marking different sequence objects for replication.

20. The system of claim 16, further comprising:
a module for sending said changes as parameters passed to a stored procedure stored at the replicate database that reconstructs the sequence object at the replicate database.

21. The system of claim 20, wherein said parameters include a sequence name for said sequence object.

22. The system of claim 20, wherein said parameters include a primary sequence value for said sequence object.

23. The system of claim 20, wherein said parameters include a sequence increment value for said sequence object.

24. The system of claim 16, wherein changes to the system table are logged to the log file, so that such changes may be read by the log reader employed for replicating sequence objects.

25. The system of claim 24, wherein the log reader includes program logic for recognizing log information in the log file corresponding to table data inserted into a system sequence table as special purpose information supporting sequence object replication.

26. The system of claim 16, further comprising:
program logic for incrementing a sequence value at the replicate database until it at least equals the sequence object's sequence value at the primary database.

27. The system of claim 26, wherein the program logic includes:
a loop that increments a sequence value at the replicate database, until the sequence value at the replicate database equals the sequence object's sequence value at the primary database.

28. The system of claim 16, further comprising:
a stored procedure at the replicate database for incrementing a sequence value at the replicate database until it at least equals the sequence object's sequence value at the primary database if the sequence object is defined to have an ascending sequence interval; and, otherwise, decrementing the sequence value at the replicate database until it is no greater than the sequence object's sequence value at the primary database if the sequence object is defined to have a descending sequence interval.

29. The system of claim 16, wherein said primary database comprises a relational database of a first type and said replicate database comprises a relational database of a second type, and said sequence object comprises a sequence object supported by the relational database of the first type.

30. The system of claim 16, wherein said log file is itself without direct support for replicating sequence objects.

31. A system for replicating database sequences comprising:
a computer having a processor and memory;
a primary database having a sequence defined, wherein the sequence comprises a sequential series of numbers for performance of database tasks at the primary database;
a replicate database for receiving replication of database information from the primary database, including replication of the sequence;
a module for monitoring changes to table data at the primary database for capturing information sufficiently characterizing the sequence to allow its replication, the table data being logged to a log file in response to a sequential series of multiple numbers being cached for use at the primary database;
a module for reading the log file, for determining changes to apply to the replicate database for replicating the sequence; and
a module for replicating the sequence to the replicate database, based on said determined changes.

32. The system of claim 31, wherein said table data comprises table data stored in a system sequence table that governs sequences.

33. The system of claim 31, wherein said log file comprises a primary log file for said primary database.

34. The system of claim 31, further comprising:
a module for receiving user input for selectively marking different sequences for replication.

35. The system of claim 31, further comprising:
a module for sending said changes as parameters passed to a stored procedure stored at the replicate database that reconstructs the sequence at the replicate database.

36. The system of claim 35, wherein said parameters include a sequence name for said sequence.

37. The system of claim 35, wherein said parameters include a primary sequence value for said sequence.

38. The system of claim 35, wherein said parameters include a sequence increment value for said sequence.

39. The system of claim 31, wherein changes to the system table are logged to the log file, so that such changes may be read by the module for reading the log file.

40. The system of claim 39, wherein the module for reading the log file includes program logic for recognizing log information in the log file corresponding to table data inserted into a system sequence table as special purpose information supporting sequence replication.

41. The system of claim 31, further comprising:
program logic for incrementing a sequence value at the replicate database until it at least equals the sequence's current value at the primary database.

42. The system of claim 41, wherein the program logic includes:
a loop that increments a sequence value at the replicate database, until the sequence value at the replicate database equals the sequence's current value at the primary database.

43. The system of claim 31, further comprising:
a stored procedure at the replicate database for incrementing a sequence value at the replicate database until it at least equals the sequence's current value at the primary database if the sequence is defined to have an ascending sequence interval; and, otherwise, decrementing the sequence value at the replicate database until it is no greater than the sequence's current value at the primary database if the sequence is defined to have a descending sequence interval.

44. The system of claim 31, wherein said primary database comprises a relational database of a first type and said replicate database comprises a relational database of a second type, and said sequence comprises a sequence supported by the relational database of the first type.

45. The system of claim 31, wherein said log file is itself without direct support for replicating sequences.

* * * * *